United States Patent
Pever et al.

(10) Patent No.: US 10,290,986 B2
(45) Date of Patent: May 14, 2019

(54) SYSTEMS AND METHODS FOR CONNECTING POWER DISTRIBUTION DEVICES

(71) Applicant: Siemens Industry, Inc., Alpharetta, GA (US)

(72) Inventors: Steven E. Pever, Simpsonville, SC (US); Timothy J. Fink, Woodruff, SC (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/720,881

(22) Filed: Sep. 29, 2017

(65) Prior Publication Data

US 2019/0103717 A1 Apr. 4, 2019

(51) Int. Cl.
*H01R 25/16* (2006.01)
*H02G 5/08* (2006.01)
*H02G 5/00* (2006.01)

(52) U.S. Cl.
CPC ........... *H01R 25/162* (2013.01); *H02G 5/007* (2013.01); *H02G 5/08* (2013.01)

(58) Field of Classification Search
CPC ......... H01R 25/162; H02G 5/007; H02G 5/08
USPC ........................................................ 439/213
See application file for complete search history.

(56) References Cited

U.S. PATENT DOCUMENTS

| | | | | |
|---|---|---|---|---|
| 4,728,752 A * | 3/1988 | Hicks, Jr. | ............... | H02G 5/007 174/71 B |
| 5,760,339 A * | 6/1998 | Faulkner | ............... | H01R 25/162 174/88 B |
| 5,783,779 A * | 7/1998 | Graham | ................. | H02G 5/007 174/88 B |
| 5,811,733 A * | 9/1998 | Flaig | ........................ | H02G 5/06 174/72 B |
| 6,435,888 B1* | 8/2002 | Reed, Jr. | .................. | H01R 4/30 174/88 B |
| 8,550,830 B1* | 10/2013 | Bhathija | ................ | H01R 31/02 439/213 |
| 9,190,791 B1* | 11/2015 | Jaena | .................... | H01R 25/162 |
| 9,407,079 B1* | 8/2016 | Kokenda | .................. | H02G 5/00 |
| 9,520,703 B2* | 12/2016 | Jaena | ....................... | H02G 5/08 |
| 9,590,405 B1* | 3/2017 | Maurer | ................ | H01R 25/145 |
| 9,590,406 B1* | 3/2017 | Maurer | ................ | H01R 25/145 |
| 9,698,548 B2* | 7/2017 | Jaena | .................... | H01R 25/162 |

(Continued)

*Primary Examiner* — Tulsidas C Patel
*Assistant Examiner* — Peter G Leigh
(74) *Attorney, Agent, or Firm* — Siemens Corporation (57) ABSTRACT

A multi-bolt joint stack for use in an electrical power distribution system. The joint stack includes (1) a plurality of conductive plate sets, each plate set including a first conductive plate and a second conductive plate separated by a first spacer and a second spacer; (2) a first clamping bolt extending through the plurality of conductive plate sets and the first spacer of each conductive plate set; and (3) a second clamping bolt extending through the plurality of conductive plate sets and the second spacer of each conductive plate set. The first and second clamping bolts are separated from each other to define a plurality of pockets within the joint stack, each pocket being formed by the first and second conductive plates and first and second spacers of the plurality of conductive plate sets. The pockets are configured to receive electrical stabs. Numerous other aspects are provided.

18 Claims, 10 Drawing Sheets

(56) References Cited

U.S. PATENT DOCUMENTS

| | | | |
|---|---|---|---|
| 9,705,299 B1 * | 7/2017 | Maurer | H02G 5/007 |
| 9,705,300 B1 * | 7/2017 | Maurer | H02G 5/007 |
| 2011/0132635 A1 * | 6/2011 | Lesieur | H02G 5/007 |
| | | | 174/68.2 |
| 2011/0136362 A1 * | 6/2011 | O'Leary | H02G 5/007 |
| | | | 439/213 |

* cited by examiner

SYSTEMS AND METHODS FOR CONNECTING POWER DISTRIBUTION DEVICES

FIELD

The present disclosure relates to busway systems for electrical power distribution.

BACKGROUND

Commercial and industrial power distribution systems may use several methods to deliver and distribute electrical energy. These methods may include heavy conductor cables run in trays or conduit. Unfortunately, once installed, cable and conduit assemblies are difficult to change.

Electrical power may also be distributed using conductors or "bus bars" in an enclosure. This arrangement is referred to as a busway. A busway is understood in the industry as a prefabricated electrical power distribution system having bus bars in a protective enclosure, and may include straight lengths, fittings, devices, and accessories.

Busway-based power distribution systems may be used for many electrical power distribution applications including, for example, industrial settings and high-rise buildings. In many settings, space for electrical power distribution may be at a premium, particularly in high-rise buildings. Methods and apparatus for reducing space requirements of electrical power distribution systems are desirable.

SUMMARY

In some embodiments, an electrical power distribution system is provided that includes (1) a pocketed multi-bolt joint stack having a first end and a second end; (2) a first busway section having a first set of bus bars and a first joint end, the first joint end and the first end of the pocketed multi-bolt joint stack disposed in a first interleaved relationship; (3) a second busway section having a second set of bus bars and a second joint end, the second joint end and the second end of the pocketed multi-bolt joint stack disposed in a second interleaved relationship; and (4) a first bolt, and a second bolt, each disposed in the pocketed multi-bolt joint stack, the first bolt and the second bolt having a spaced-apart relationship such that a region of the pocketed multi-bolt joint stack between the first bolt and the second bolt provides one or more pockets. The one or more pockets are configured to receive one or more electrical stabs from a tap box.

In some embodiments, a method is provided that includes (1) coupling a first joint end of a first busway section to a second joint end of a second busway section with a pocketed multi-bolt joint stack, wherein the first busway section and the second busway section are nominally co-linear; and (2) coupling a tap box to the pocketed multi-bolt joint stack. The pocketed multi-bolt joint stack includes at least two spaced-apart clamping bolts that are spaced apart from each other in a linear direction of the first and second busway sections so as to define one or more pockets for the tap box to couple to the pocketed multi-bolt joint stack.

In some embodiments, a multi-bolt joint stack is provided for use in forming an electrical power distribution system. The multi-bolt joint stack includes (1) a plurality of conductive plate sets, each conductive plate set including a first conductive plate and a second conductive plate separated by a first spacer and a second spacer; (2) a first clamping bolt extending through the plurality of conductive plate sets and the first spacer of each conductive plate set; and (3) a second clamping bolt extending through the plurality of conductive plate sets and the second spacer of each conductive plate set. The first clamping bolt and the second clamping bolt are separated from each other so as to define a plurality of pockets within the multi-bolt joint stack, each pocket being formed by the first conductive plate, the second conductive plate, the first spacer and the second spacer of the plurality of conductive plate sets. The plurality of pockets are configured to receive electrical stabs. Numerous other aspects are provided.

Other features and aspects of the present invention will become more fully apparent from the following detailed description, the appended claims and the accompanying drawings

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of this disclosure.

Briefly, various embodiments of this disclosure provide methods and apparatus for joining busway sections to each other at a joint, and electrically coupling a tap box to the joint. In some embodiments, a joint end of a first busway section and a joint end of a second busway section are coupled to each other with a pocketed multi-bolt joint stack having at least two clamping bolts that are spaced apart from each other laterally (e.g., in the linear direction of the first and second busway sections). The spaced-apart clamping bolts are disposed in the pocketed multi-bolt joint stack such that a first one of the at least two clamping bolts is closer to the joint end of the first busway section than to the joint end of the second busway section; and a second one of the at least two clamping bolts is closer to the joint end of the second busway section than to the joint end of the first busway section. A region of the joint stack between the spaced-apart clamping bolts provides one or more pockets into which electrical stabs of a tap box may be disposed.

A tap box having one or more electrical stabs protruding therefrom may be coupled to the pocketed multi-bolt joint stack such that the electrical stabs are disposed in the pocket(s) of the joint stack between the spaced-apart clamping bolts. With this configuration, and a clamping force applied by the clamping bolts, electrical continuity may be provided between the bus bar ends of the first joint end of the first busway section, the bus bar ends of the second joint end of the second busway section, and the electrical stabs of the tap box. This configuration further provides mechanical support for the tap box by way of the electrical stabs bolted into the pocketed multi-bolt joint stack.

While the pocketed multi-bolt joint stack is described primarily with regarding to two bolts, it will be understood that additional bolts may be employed (e.g., multiple rows of two bolt pairs, 3 bolts, 4 bolts, etc.). As used herein, a bolt refers to any securing mechanism that may be employed to securely hold together a first busway section, a second busway section and/or a tap box within the pocketed joint stack (e.g., while providing one or more pockets for electrical stabs). Bolts may be circular, rectangular, or otherwise shaped, and may be threaded or unthreaded.

Busway-based electrical power distribution systems may be used to distribute electrical power throughout buildings, particularly commercial or industrial buildings. A busway run includes a number of busway sections which are connected to one another by busway joints. Busway joints may include a stack of electrically conductive plates with bolt holes formed therein.

Figure 1A:
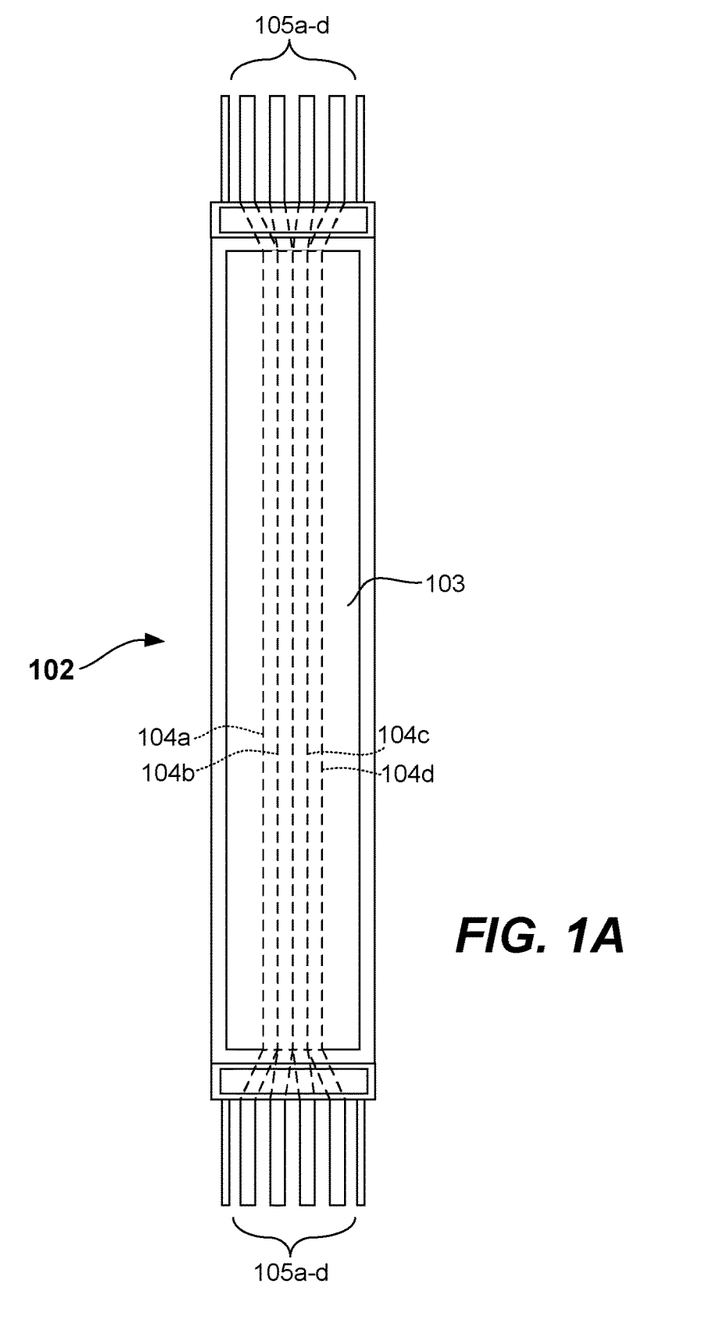
FIG. 1A illustrates a busway section in a vertical riser configuration with its cover housing in place, and joint ends of the busway section at top and bottom thereof that are configured for joining with a pocketed multi-bolt joint stack in accordance with an example embodiment of this disclosure.

FIG. 1A illustrates a busway section 102 in a vertical riser configuration with its cover housing 103 in place to isolate bus bars 104a-d, with ends 105a-d of bus bars 104a-d of busway section 102 at the top and bottom thereof. As discussed further below, bus bar ends 105a-d are configured for joining with a pocketed multi-bolt joint stack in accordance with an example embodiment of the this disclosure. While four bus bars are shown in FIG. 1A, it will be understood the fewer or more bus bars may be employed (e.g., 1, 2, 3, 5, 6, etc.).

Figure 1B:
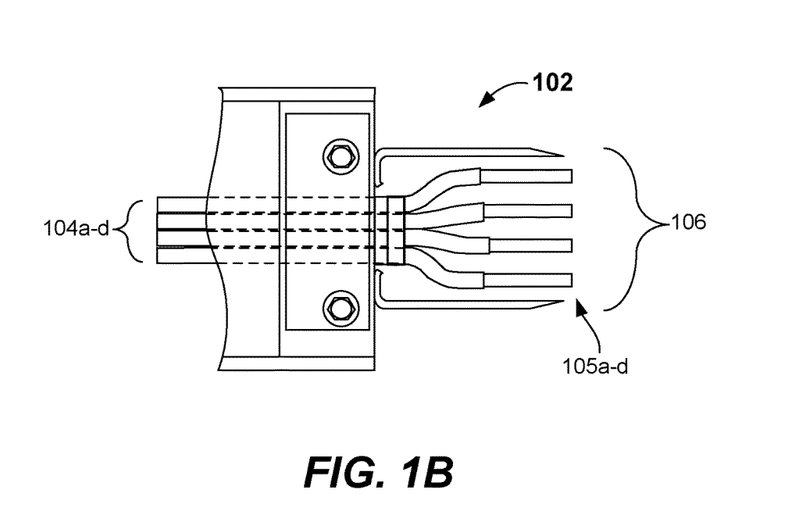
FIG. 1B illustrates several bus bar ends, spaced apart one from the other and with insulation removed, that together comprise the joint end of the busway section in accordance with an example embodiment of this disclosure.

FIG. 1B illustrates several bus bar ends 105a-d, spaced apart one from the other and with electrical insulation removed, that together comprise a joint end 106 of busway section 102. As discussed further below, having bus bar ends 105a-d without electrical insulation provides for electrical continuity between busway sections, and between busway sections and a tap box (FIGS. 4A and 4B) in accordance with an example embodiment of this disclosure.

Figure 1C:
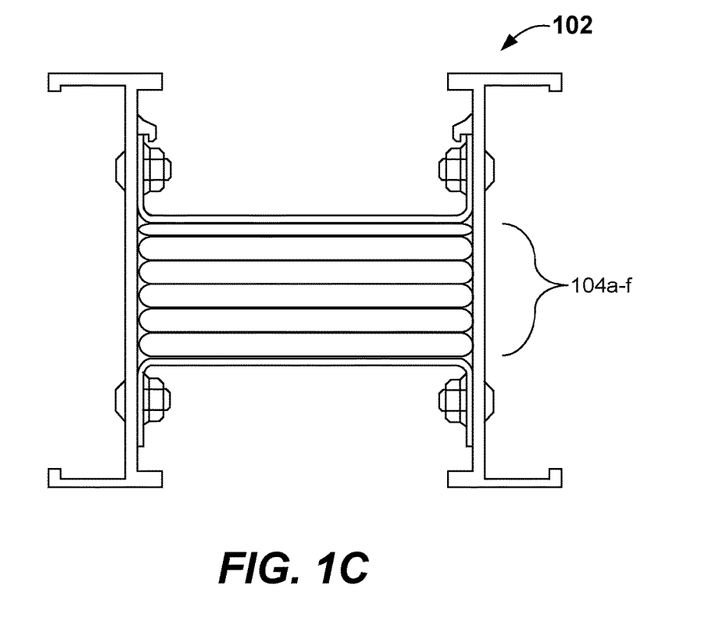
FIG. 1C illustrates a cross-section of a busway section showing several bus bars in a stacked configuration in accordance with an example embodiment of this disclosure.

FIG. 1C illustrates a cross-sectional view of busway section 102 showing several bus bars 104a-f in a stacked configuration in accordance with an example embodiment of this disclosure. As stated, fewer or more bus bars may be employed, and bus bars of different dimensions may be employed. Other methods for securing bus bars within a busway section may be used.

In some embodiments, busway sections may include a housing 103 that encloses a plurality of bus bars. Bus bars may be formed from electrically conductive material, such as but not limited to, copper, aluminum or the like. In operation, energized bus bars may be, for example, phase bus bars, neutral bus bars, or ground bus bars depending on the particular application. High-amp busways, utilizing large bus bars, may be employed for applications requiring current capacity of 600 amperes or higher. For applications requiring less current, for example, 100 amperes, low-amp busways may be employed. Low-amp bus bars, due to their lower current capacity requirements, are typically smaller than their high-amp counterparts, and in some embodiments, may be spaced closer than high-amp bus bars.

Electrical loads, such as, but not limited to, appliances, electronics, machines, lights, tools and other components requiring electricity, may be provided with access to the electrically conductive bus bars at various power tap-off locations disposed along the busway. Some busway systems provide an opening through the busway housing at power tap-off locations where the conductive material of a bus bar is exposed for connection with an appropriate plug connector, bus plug or the like.

Busways typically are installed horizontally and/or vertically. Busways are often installed horizontally in industrial settings to provide electrical power to lighting and/or electrical equipment. Busways may be installed vertically in high-rise buildings (commercial and/or residential) to provide electrical power for various electrical loads, including but not limited to, lighting, electronics, appliances, air conditioning, and the like. Vertically oriented busway sections may be referred as "risers."

Example Embodiments

Referring to FIGS. 2-4C, various example embodiments of the present disclosure are provided. In accordance with one or more embodiments, a busway-based electrical power distribution system may include a pocketed multi-bolt joint stack, and a tap box having electrical stabs protruding therefrom. Such a pocketed multi-bolt joint stack, and tap box having electrical stabs protruding therefrom in accordance with the present disclosure, may be used in a busway run as a means of supplying or distributing electrical power into or from a busway system. In some example embodiments, a tap box may be coupled to the busway run at a pocketed multi-bolt joint stack rather than through an opening in a busway section housing.

A busway-based electrical power distribution system in accordance with the present disclosure may provide benefits such as, but not limited to, compact size, high interrupt capacity, and/or manifold-inserted and clamped connections. A pocketed multi-bolt joint stack in accordance with the present disclosure may remain compact in section dimensions but vary in length compared to conventional joint assemblies. The additional length supports multiple rows of clamp bolts for clamping the busway-based electrical power distribution system together.

Figure 2:
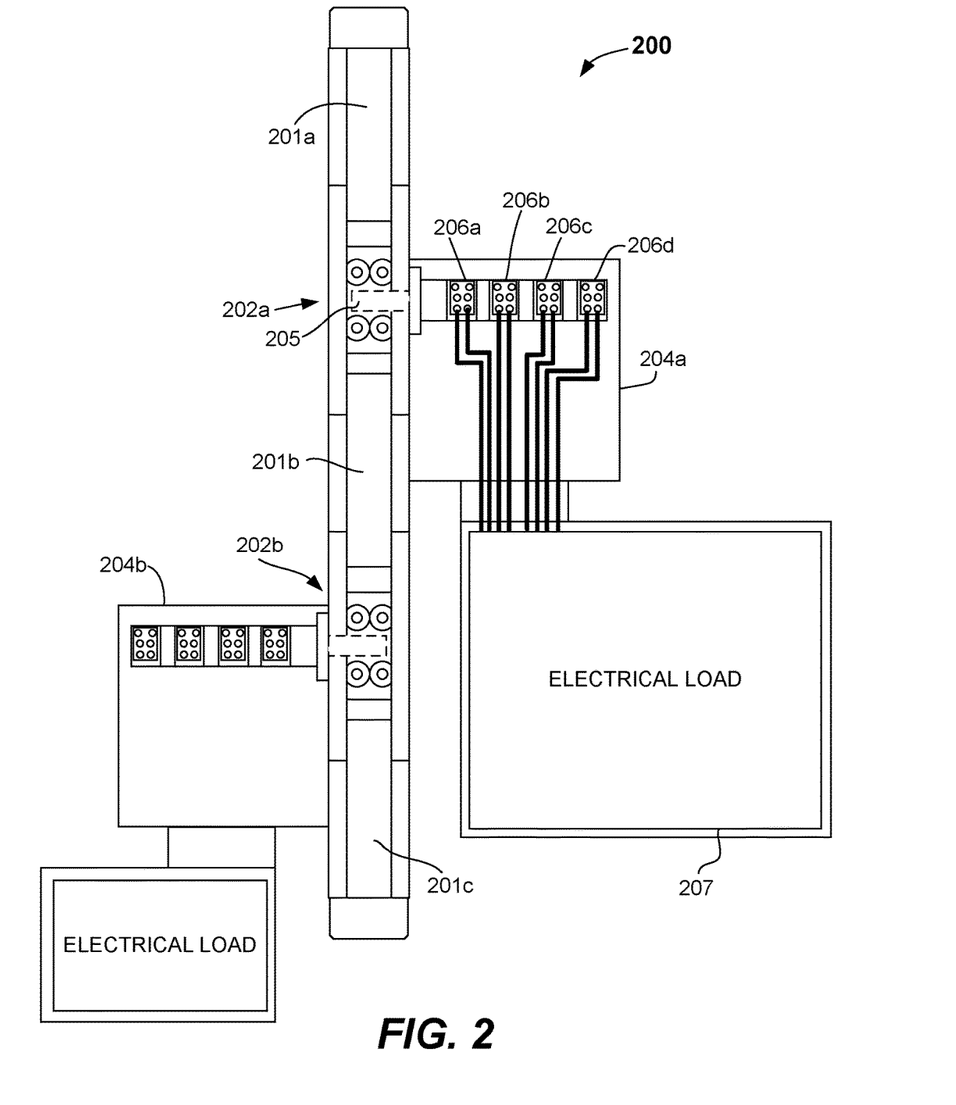
FIG. 2 illustrates an example busway run with busway sections coupled by pocketed multi-bolt joint stacks in accordance with an example embodiment of this disclosure.

FIG. 2 illustrates a top view of an example busway power distribution system 200 provided in accordance with the present disclosure. The busway power distribution system 200 includes first, second and third busway sections 201a, 201b and 201c coupled by multi-bolt joint stacks 202a, 202b. A first tap box 204a is shown coupled to multi-bolt joint stack 202a and a second tap box 204b is shown coupled to multi-bolt joint stack 202b. Tap box 204a has one or more electrical stabs 205 electrically coupled to one of the bus bars (not shown) of interconnected busway sections 201*a*, 201*b* and 201*c*, which transfer electrical energy to one or more connection locations 206*a*-*d* within tap box 204*a*. Connection locations 206*a*-*d* may supply electrical power to electrical load 207, for example. Fewer or more connection locations may be provided. Tap box 204*b* may be similarly configured.

Figure 3A:
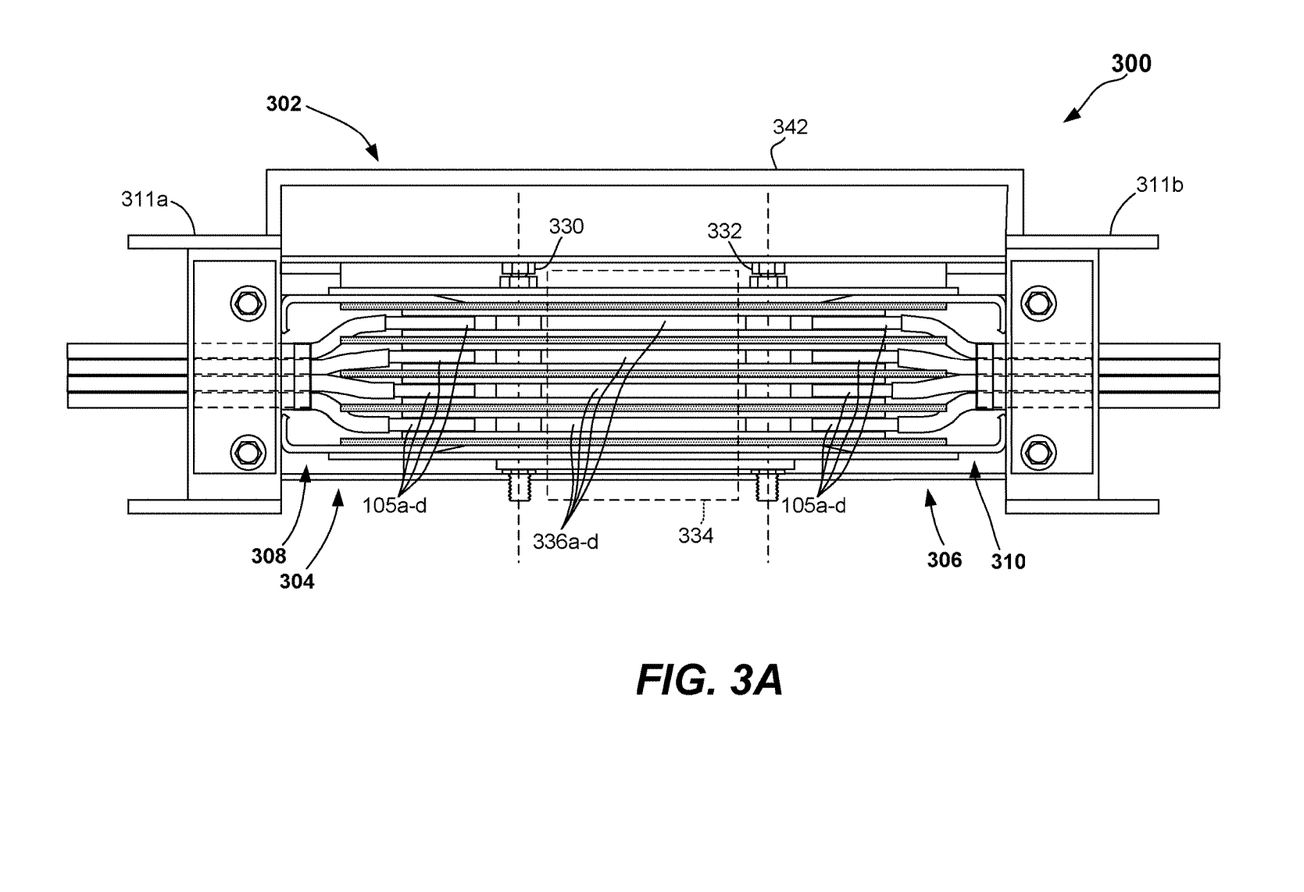
FIG. 3A illustrates a side view of an example busway run with busway sections coupled by a pocketed multi-bolt joint stack having pockets formed between the bolts in accordance with an example embodiment of this disclosure.
Figure 3B:
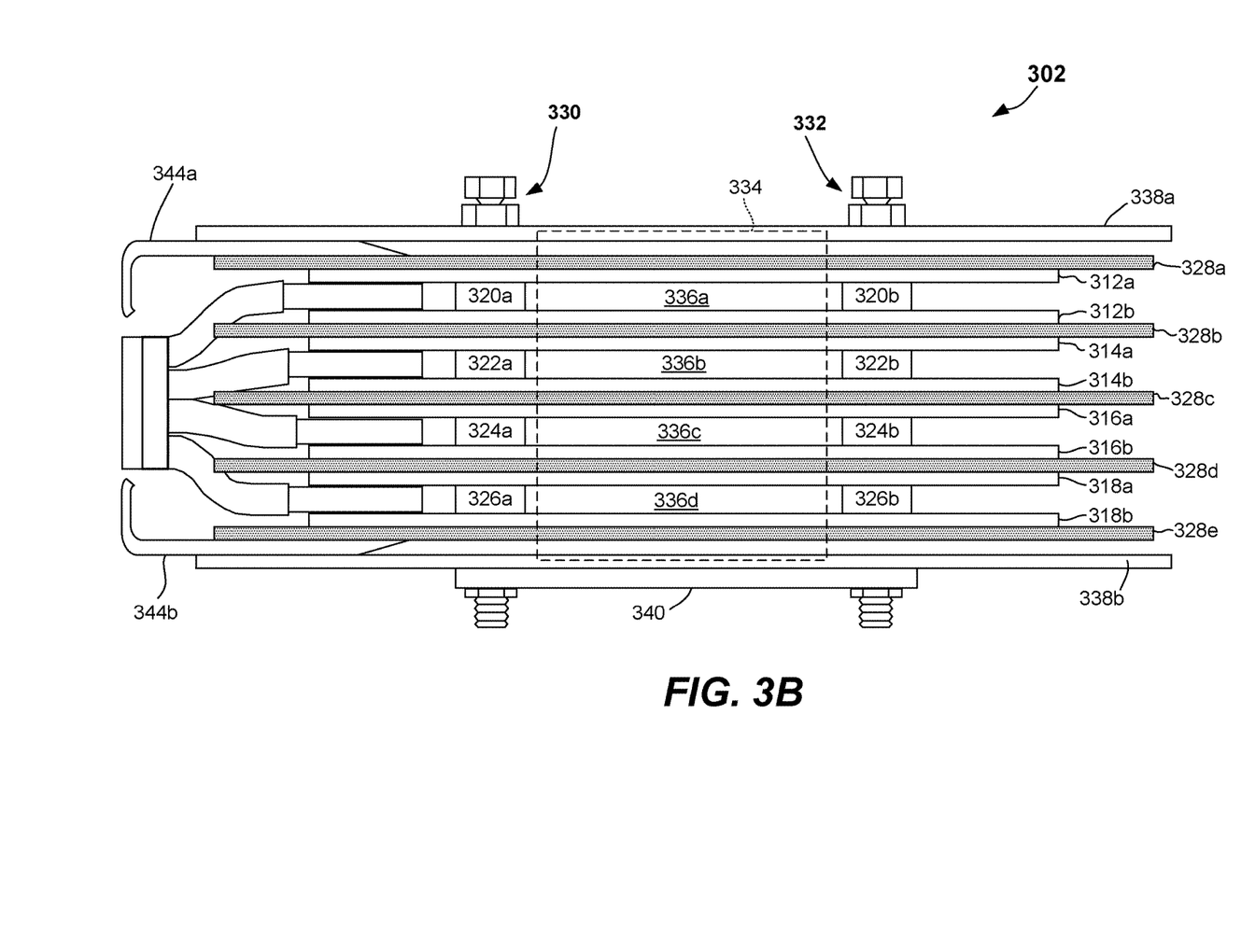
FIG. 3B is an enlarged portion of the multi-bolt joint stack of FIG. 3A.

FIG. 3A illustrates a side view of an example busway run 300 with busway sections coupled by a pocketed multi-bolt joint stack with pockets formed between bolts in accordance with an example embodiment of the present disclosure. FIG. 3B is an enlarged portion of the multi-bolt joint stack of FIG. 3A.

Referring to FIGS. 3A and 3B, a pocketed multi-bolt joint stack 302 may be configured, at each of its ends 304, 306, to clamp onto the joint ends 308, 310 of busway sections 311*a*, 311*b*. More specifically, as shown in FIG. 3B, pocketed multi-bolt joint stack 302 includes sets of conductive plates 312*a*-*b*, 314*a*-*b*, 316*a*-*b* and 318*a*-*b* each separated by a spacers 320*a*-*b*, 322*a*-*b*, 324*a*-*b* and 326*a*-*b*. Each set of conductive plates is isolated from other sets of conductive plates by insulating layers 328*a*-*e*. Clamping bolts 330, 332 are shown inserted into pocketed multi-bolt joint stack 302, and extend through the sets of conductive plates 312*a*-*b*, 314*a*-*b*, 316*a*-*b* and 318*a*-*b* and spacers 320*a*-*b*, 322*a*-*b*, 324*a*-*b* and 326*a*-*b* as shown.

As shown in FIGS. 3A and 3B, bolts 330, 332 and spacers 320*a*-*b*, 322*a*-*b*, 324*a*-*b* and 326*a*-*b* define a middle section 334 (shown in phantom) that includes a plurality of pockets 336*a*-*d*. As described further below, in some embodiments, pockets 336*a*-*d* may be employed to receive electrical stabs of a tap box. Top and bottom plates 338*a*, 338*b* cover the sets of conductive plates. In some embodiments, a connector rail 340 (FIG. 3B) may be provided between bolts 330, 332. One or more washers (not shown) may be used at one or both ends of bolts 330, 332 to distribute any clamping force from bolts 330, 332.

In some embodiments, conductive plates 312*a*-*b*, 314*a*-*b*, 316*a*-*b* and 318*a*-*b* may be formed from copper, aluminum, or the like. Spacers 320*a*-*b*, 322*a*-*b*, 324*a*-*b* and 326*a*-*b* may be formed from ethylene propylene diene monomer (EPDM) or a similar insulating elastomer, for example. Top and bottom plates 338*a*, 338*b* may be formed from polyester powder coated extruded aluminum in some embodiments. Insulating layers 328*a*-*e* may be, for example, an extruded glass polyester resin, a ceramic or the like. Other conductive plate, spacer, top/bottom plate, and/or insulating layer materials may be used. Example thicknesses for the conductive plates, top and bottom plates and insulating layers range from about 2 mm to about 8 mm. Example spacer heights range from about 1 mm to about 13 mm, and spacer outside diameters range from about 13 mm to about 26 mm. Other layer and/or spacer thicknesses, and/or other spacer diameters, may be used. Example pocket heights range from about 50 mm to about 100 mm, and/or example pocket widths range from about 25 mm to about 85 mm. Other pocket heights and/or widths may be used.

In some embodiments, clamping bolts 330, 332 may be torque-indicating double-headed breakoff bolts. In still further embodiments, other types of torque-indicating bolts may be used as clamping bolts 330, 332. In still further embodiments, non-torque-indicating bolts may be used as clamping bolts 330, 332. Clamping bolts 330, 332 may be formed from stainless steel or any other suitable material. Example bolt diameters range from about 5 mm to about 13 mm, although other bolt sizes may be used. In some embodiments, a torque of about 50 lb-ft may be used for clamping bolts 330, 332, although other torque values may be employed. To prevent clamping bolts 330, 332 from short circuiting conductive plates together, in some embodiments, clamping bolts 330, 332 may be inserted into an insulating sleeve, such as an extruded thermoplastic sleeve, for example, prior to insertion through the multi-bolt joint stack 302.

Conductive plates 312*a*-*b*, 314*a*-*b*, 316*a*-*b* and 318*a*-*b* may be rectangular, for example, and may be made from the same material(s) as the bus bar ends to which they are clamped. For example, conductive plates 312*a*-*b*, 314*a*-*b*, 316*a*-*b* and 318*a*-*b* may be formed from copper, aluminum, or any other suitable conductor. Conductive plates 312*a*-*b*, 314*a*-*b*, 316*a*-*b* and 318*a*-*b* of pocketed multi-bolt joint stack 302 provide electrically conductive pathways between bus bar ends 105*a*-*d* (FIG. 3A) of the two busway sections 311*a*, 311*b* to which they are clamped. In various embodiments, each bus bar end 105*a*-*d* has a corresponding conductive plate set in pocketed multi-bolt joint stack 302. Other numbers of bus bars, bus bar ends and pockets may be employed. As shown in FIG. 3B, in some embodiments, features 344*a*, 344*b* of busway section 311*a* and/or features (not shown in FIG. 3B) of busway section 311*b*, such as ground stabs, may be clamped between top plate 338*a* and insulating layer 328*a* and/or bottom plate 338*b* and insulating layer 328*e*.

Figure 4A:
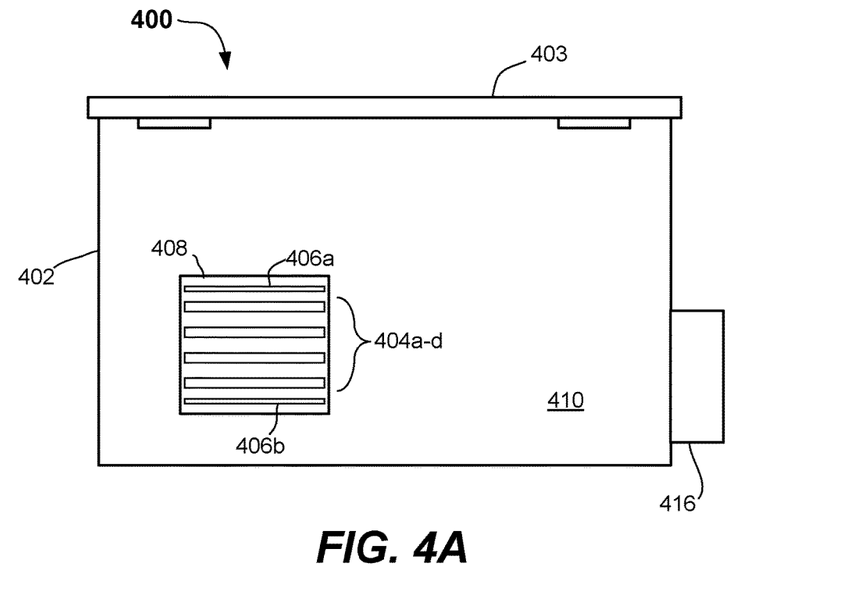
FIGS. 4A-4C illustrate example tap boxes and tap box configurations having protruding electrical stabs in accordance with an example embodiment of this disclosure.
Figure 4B:
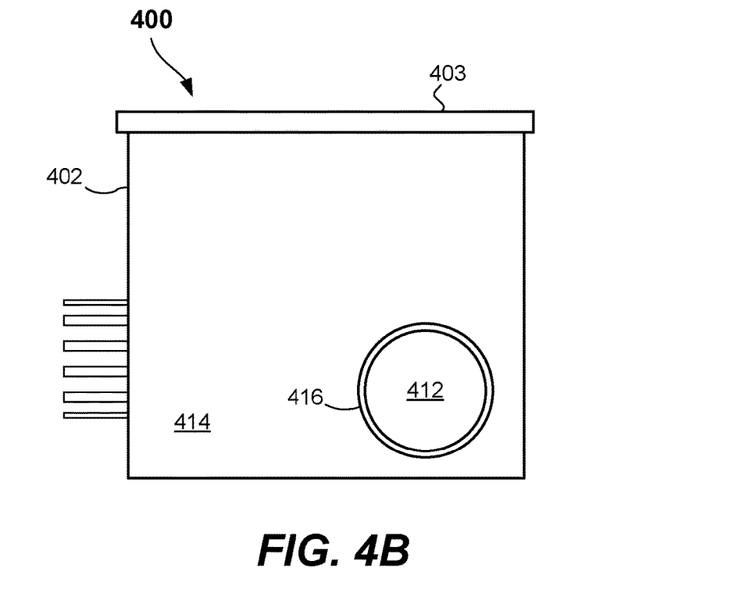
Figure 4C:
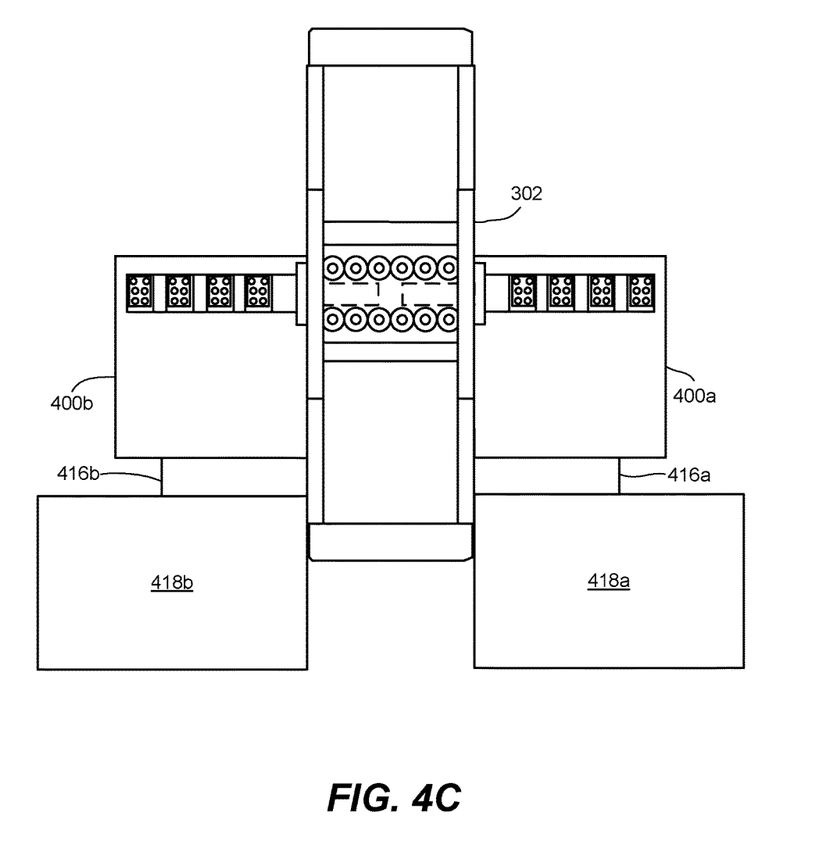

Still referring to FIGS. 3A and 3B, pocketed multi-bolt joint stack 302 may be configured such that its middle section 334 is suited to receive electrical stabs protruding from a tap box (FIGS. 4A-4C). The electrical stabs may be inserted into pockets 336*a*-*d* between pairs of clamping bolts 330, 332. The electrical stabs inserted into pockets 3336*a*-*d* may make electrical connection with corresponding conductive plates of the pocketed multi-bolt joint stack 302 as described.

A busway-based electrical power distribution system in accordance with the present disclosure may quickly make and maintain any number of electrically and mechanically reliable connections according to the number of pockets defined by clamping bolts 330, 332 provided in pocketed multi-bolt joint stack 302.

Once assembled, a cover may be installed on each side of pocketed multi-bolt joint stack 302 to provide alignment, structural support, and protection from energized components. Only a top cover 342 is shown in FIG. 3A. A bottom cover may be similarly provided. Installation is complete once the clamping bolts have been torqued to a predetermined specification. The slip-together construction of the busway-based electrical power distribution system in accordance with the present disclosure is fully reversible, thus affording easy assembly in small spaces, alteration, and/or removal.

Figure 3C:
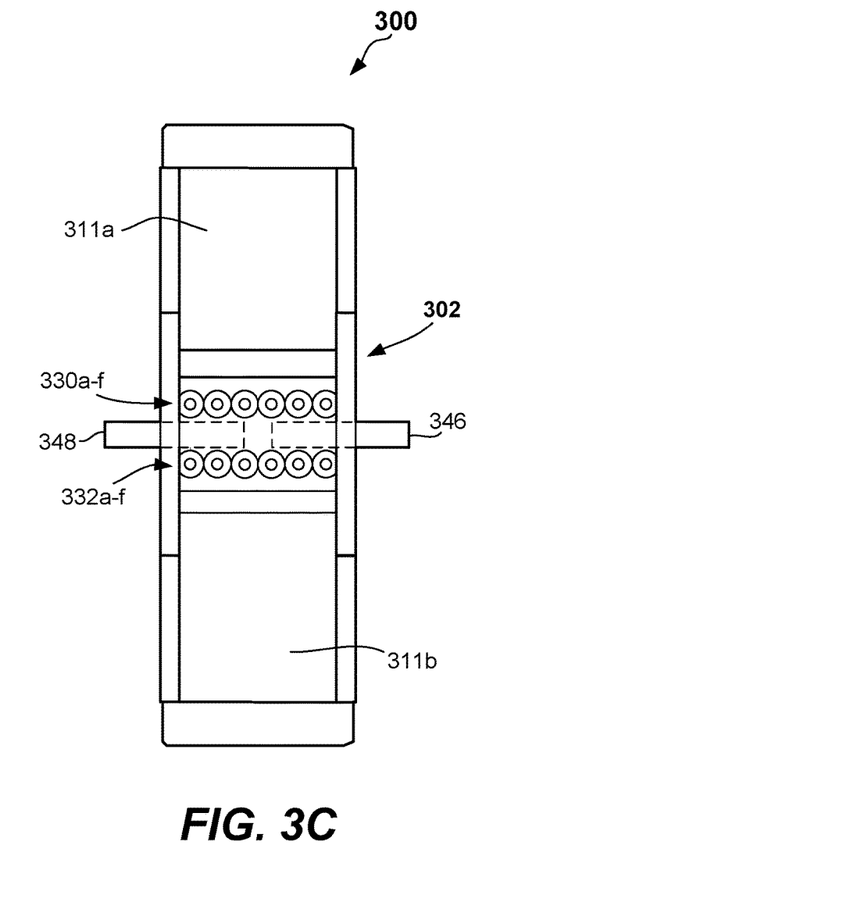
FIG. 3C illustrates a top view of an alternative embodiment of a busway-based electrical power distribution system provided in accordance with the present disclosure.

FIG. 3C illustrates a top view of an alternative embodiment of a busway-based electrical power distribution system 300 provided in accordance with the present disclosure. Busway-based electrical power distribution system 300 is gender converted by inserting fitted conductor bars 346, 348 through pockets 336*a*-*d* (FIG. 3A) of pocketed multi-bolt joint stack 302. Various example embodiments may provide male "stabs" that protrude from between any pair of clamp bolts, and from either or both sides of pocketed multi-bolt joint stack 302. Quick gender conversion increases the flexibility of example embodiments of this disclosure to fit any gender device.

FIG. 3C also illustrates that multiple rows of clamping bolts 330, 332 may be employed. For example, in FIG. 3C, six sets of clamping bolts 330*a*-*f*, 332*a*-*f* are employed.

Multiple rows of clamping bolts may allow use of longer stabs, such as high power stabs, to be employed and/or the connection of stabs on both sides of multi-bolt joint stack 302.

The pocketed multi-bolt joint stack 302 of FIGS. 2-3C may be used to connect the bus bars 104a-d of one busway section 311a (201a in FIG. 2) to the bus bars 104a-d of another busway section 311b (201b in FIG. 2) so that electrical power may flow between the busway sections. A plurality of bus bar ends 105a-d may extend from each busway section 201a, 201b, 201c, 311a, 311b. These bus bar ends 105a-d are collectively referred to herein as a "joint end" 106 of a busway section. Joint ends 106 may be received between conductive plate sets of pocketed multi-bolt joint stack 302 as shown in FIGS. 3A and 3B. The bus bar ends 105a-d of a busway section's joint end 106 may have a portion of their electrical insulation removed to facilitate conduction of electrical current through pocketed multi-bolt joint stack 302 to the next adjacent busway section.

FIGS. 4A and 4B illustrate a front view and a side view, respectively, of an example tap box 400 having an enclosure 402 and (hinged) cover 403, and protruding electrical stabs 404a-d, 406a-b in accordance with an example embodiment of this disclosure.

In some example embodiments, tap box 400 may have one or more bus plugs disposed therein, such as connection locations 206a-d shown in FIG. 2. Such bus plugs are configured to connect with and provide electrical power to downstream circuits. Tap box enclosure 402 may comprise any material(s) suitable for housing the bus plugs. The example tap box enclosure 402 of FIGS. 4A and 4B is comprised of metal such as aluminum, although other materials may be used.

In some example embodiments, tap box 400 may have an opening 408 in a first side 410 of tap box enclosure 402. One or more electrical stabs 404a-d, 406a-b may extend outwardly from the interior of tap box 400 through the opening 408 in the first side 410 of tap box 400. In this example embodiment, the number of, thickness of, width of, and spacing between, electrical stabs 404a-d, 406a-b, are configured such that electrical stabs 404a-d, 406a-b may be received within pockets of pocketed multi-bolt joint stack 302 (e.g., with stabs 404a-d being active bus stabs that may reside within pockets 336a-d of FIGS. 3A and 3B, and stabs 406a-b being ground stabs that may reside between top plate 338a and insulating layer 328a and bottom plate 338b and insulating layer 328e, respectively). After the busway joint ends 106 of busway sections 311a, 311b and electrical stabs 404a-d are received in pockets 336a-d of pocketed multi-bolt joint stack 202 (and/or ground stabs are received below top plate 338a and above bottom plate 338b), clamping bolts 330, 332 may be torqued to provide and maintain an electrical connection between the busway run of the busway sections 311a, 311b and the electrical stabs 404a-d of tap box 400.

As shown in FIGS. 3A and 3B, in some example embodiments in accordance with this disclosure, an electrical power distribution system 300 may include a pocketed multi-bolt joint stack 302 having a first end 304 and a second end 306, a first busway section 311a having a first joint end 106 (FIG. 1B), the first joint end 106 and the first end 304 of the pocketed multi-bolt joint stack 302 disposed in a first interleaved relationship. A second busway section 311b may have a second joint end 106, the second joint end 106 and the second end 306 of the pocketed multi-bolt joint stack 302 disposed in a second interleaved relationship. A first bolt 330, and a second bolt 332, may be each disposed in the pocketed multi-bolt joint stack 302, the first bolt 330 and the second bolt 332 having a spaced-apart relationship such that a section of the pocketed multi-bolt joint stack 302 between the first bolt 330 and the second bolt 332 provides one or more pockets 336a-d. The one or more pockets 336a-d are configured to receive one or more electrical stabs 404a-d from a tap box 400. In such example embodiments, the first bolt 330 may be disposed in the pocketed multi-bolt joint stack 302 closer to the first busway joint end than to the second busway joint end, and the second bolt 332 may be disposed in the pocketed multi-bolt joint stack 302 closer to the second busway joint end than to the first busway joint end. In some example embodiments, the first busway section 311a, the pocketed multi-bolt joint stack 302, and the second busway section 311b may be co-linear with each other (as shown in FIG. 3A, for example). In some example embodiments the co-linear first busway section, pocketed multi-bolt joint stack, and second busway section may be vertically oriented (see, for example, FIG. 2).

Various example embodiments in accordance with this disclosure may include a tap box having one or more electrical stabs protruding from a side thereof, wherein the electrical stabs are disposed within the pockets of the pocketed multi-bolt joint stack. The first bolt and the second bolt may be configured to clamp together the joint stack, the first joint end of the first busway section, the second joint end of the second busway section, and the electrical stabs of the tap box. An example pocketed multi-bolt joint stack may be configured to provide electrical continuity between the first joint end, the second joint end, and the electrical stabs of the tap box. In such example embodiments, the first bolt and the second bolt of the pocketed multi-bolt joint stack may be positioned and/or torqued to provide nominally equal clamping force between the first joint end of the first busway section, the second joint end of the second busway section, and the electrical stabs of the tap box.

In some example embodiments of this disclosure, and as shown in FIG. 3A, the first bolt 330 does not extend through the bus bars ends of busway sections or the electrical stabs of the tap box, and the second bolt 332 does not extend through the bus bars ends of busway sections or the electrical stabs of the tap box (e.g., the bus bar ends and electrical stabs are clamped in place by the bolts 330, 332). The first busway section 311a may include a first housing that encloses at least a portion of the first set of one or more bus bars, and the second busway section 311b may include a second housing that encloses at least a portion of the second set of one or more bus bars (as shown, for example, by cover housing 103 in FIG. 1A).

In some example embodiments, bus bars may be made from aluminum. In other example embodiments bus bars may be made from copper. In still other example embodiments bus bars may be plated with, for example, tin or silver. Such plated materials may be applied by, for example, electroplating. In some example embodiments, the electrically conductive bus bars, such as bus bars 104a-d of FIG. 1A, may be coated with an electrically insulating material such as an extruded thermoplastic or other insulating material, except for a portion of the bus bar ends 105a-d that comprise a joint end 106 intended to be received in a pocketed multi-bolt joint stack 302.

In some example embodiments of the present disclosure, an electrical power distribution system may include a pocketed multi-bolt joint stack having a first end, a second end, and a middle region; a first busway section clamped to the first end of the joint stack; a second busway section clamped to the second end of the joint stack; and a plurality of electrical stabs clamped to the middle region of the joint stack. The plurality of electrical stabs may be coupled to a tap box. In some embodiments the tap box may include an enclosure. The plurality of electrical stabs may pass through one or more corresponding electrical stab openings in a first side of the enclosure. In some embodiments, the first busway section, the second busway section, and the plurality of electrical stabs may be clamped to the joint stack by at least a first clamping bolt and a second clamping bolt The first clamping bolt and the second clamping bolt are spaced apart so as to define the middle region of the joint stack. In some embodiments, the electrical power distribution system further includes a cable opening 412 (FIG. 4B) in a second side 414 of tap box 400; and a cable exit raceway 416 (FIGS. 4A and 4B) coupled, at a first end thereof, to the cable opening 412. Still further example embodiments may include a downstream device, such as the electrical loads shown in FIG. 2, with circuit protection coupled to a second end of the cable exit raceway. FIG. 4C illustrates a top view of two tap boxes 400a, 400b coupled to a single joint stack 302. Cable exit raceways 416a, 416b provide downstream devices 418a, 418b access to tap boxes 400a, 400b, respectively.

Figure 5:
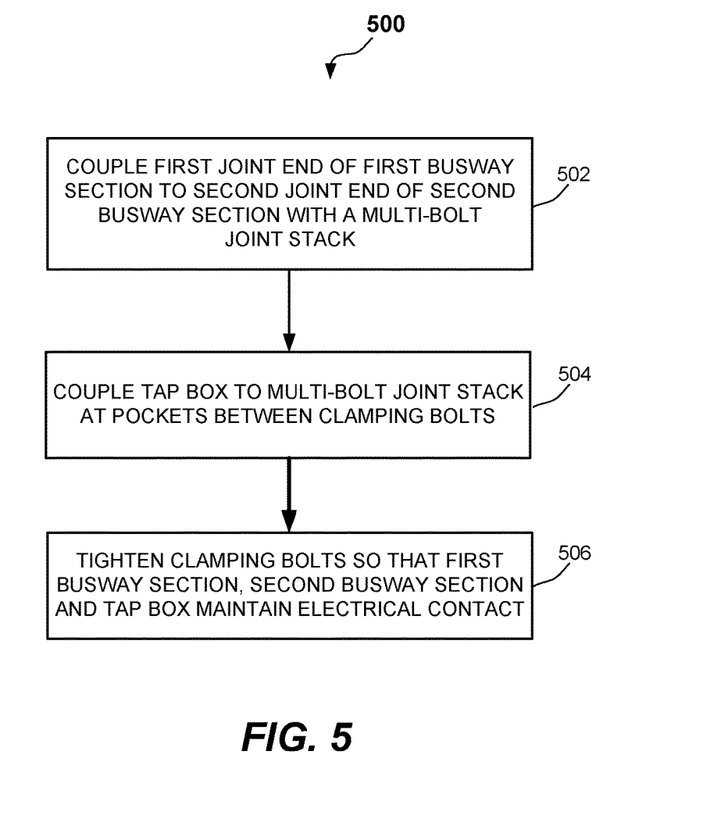
FIG. 5 illustrates a flow diagram of a method of assembling a busway run and joint-mounted tap box using a pocketed multi-bolt joint stack in accordance with an example embodiment of this disclosure.

FIG. 5 illustrates a flow diagram of a method 500 of assembling a busway run and joint-mounted tap box using a pocketed multi-bolt joint stack in accordance with an example embodiment of this disclosure. In some example embodiments, method 500 of coupling a tap box to a busway joint stack may include, coupling 502 a first joint end of a first busway section to a second joint end of a second busway section with a pocketed multi-bolt joint stack. The first busway section and the second busway section may be nominally co-linear. Method 500 may further include coupling 504 a tap box to the pocketed multi-bolt joint stack. In such example embodiments, the pocketed multi-bolt joint stack may include at least two clamping bolts that are spaced apart from each other in a linear direction of the first and second busway sections. Further, such example embodiments may include disposing a first one of the clamping bolts in the pocketed multi-bolt joint stack such that the first clamping bolt is closer to the first joint end of the first busway section than to the second joint end of the second busway section, and disposing a second clamping bolt in the pocketed multi-bolt joint stack such that the second clamping bolt is closer to the second joint end of the second busway section than to the first joint end of the first busway section. In various example embodiments, a region of the pocketed multi-bolt joint stack between the clamping bolts provides one or more pockets into which one or more electrical stabs of a tap box may be disposed. Method 500 may include tightening 506 the clamping bolts so that the first busway section, the second busway section and the tap box maintain electrical contact.

Figure 6A:
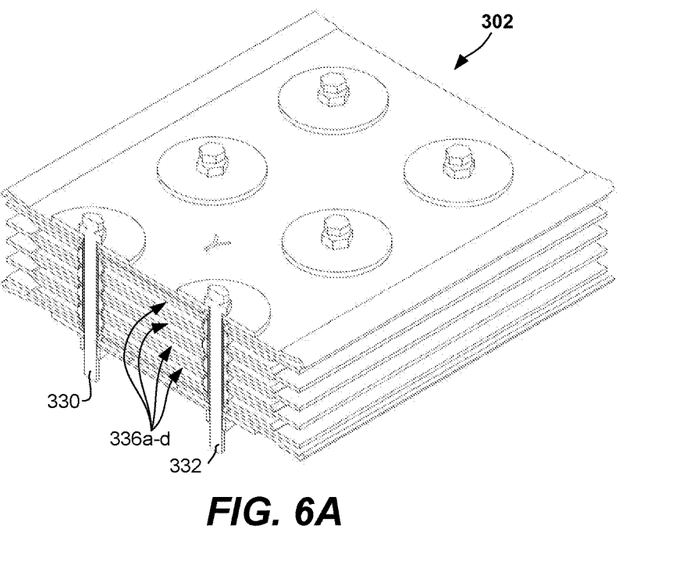
FIGS. 6A and 6B are a partial side isometric view and a front cross-sectional view, respectively, of another example pocketed multi-bolt joint stack provided in accordance with the present disclosure.
Figure 6B:
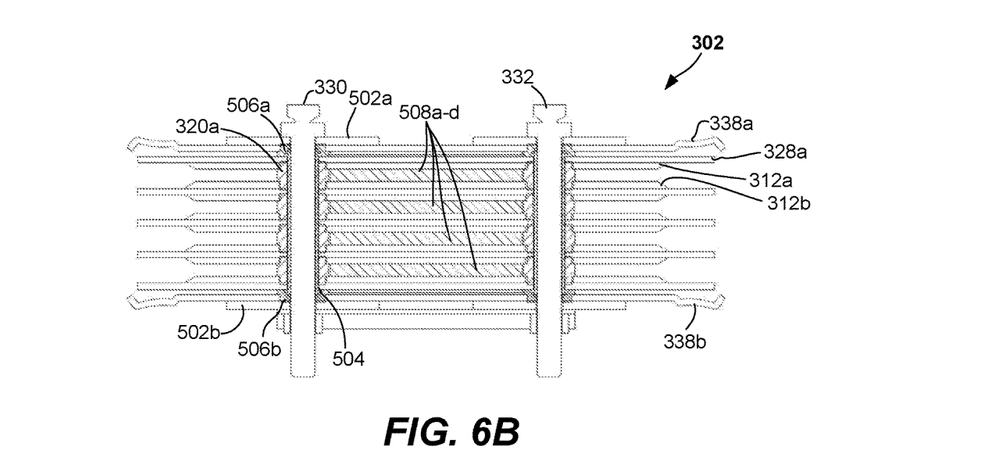

FIGS. 6A and 6B are a partial side isometric view and a front cross-sectional view, respectively, of another example pocketed multi-bolt joint stack 302 provided in accordance with the present disclosure. With reference to FIGS. 6A and 6B, the pocketed multi-bolt joint stack 302 may include multiple rows of clamping bolts 330, 332 (FIG. 6A). As shown in FIG. 6B, clamping bolts 330, 332 extend through pocketed multi-bolt joint stack 302. Top and bottom washers 502a, 502b are provided in some embodiments. As mentioned, clamping bolts 330, 332 may be electrically isolated from the conductive plates of joint stack 302 by inserting each clamping bolt 330, 332 into an insulating sleeve 504 (e.g., an extruded thermoplastic sleeve). Top and bottom plates 338a, 338b may include openings through which insulating rings 506a, 506b are positioned. Insulating rings 506a, 506b may help position and electrically isolate top and bottom plates 338a, 338b. In some embodiments, insulating rings 506a, 506b may be formed from EPDM or a similar insulating elastomer.

When one or more pockets 336a-d (FIG. 6A) are not in use, one or more pocket spacer 508a-d (FIG. 6B) may be positioned within any empty pocket 336a-d (e.g., to help maintain the shape of joint stack 302). Pocket spacers 508a-b may be formed from aluminum or a similar material.

As shown in FIG. 6B, the spacers (see also FIG. 3B) used between conductive plates of joint stack 302 may include upper and lower stepped-in regions that extend into each conductive plate (as shown, for example, by spacer 320a and conductive plates 312a, 312b in FIG. 6B). This may facilitate alignment of the conductive plates within joint stack 302.

Various example embodiments may include providing a tap box having one or more electrical stabs protruding from a first side thereof, and disposing the one or more electrical stabs in the pocket(s) between the at least two spaced-apart clamping bolts. Still further example embodiments may include providing the first busway section, the first busway section having a first set of one or more bus bars, and providing the second busway section, the second busway section having one or more bus bars. The first busway section may include a first housing that encloses at least a portion of the first set of one or more bus bars, and the second busway section may include a second housing that encloses at least a portion of the second set of one or more bus bars.

As used herein, the term "and/or" includes any or all combinations of one or more of the associated listed items.

The terms first, second, etc., may be used herein to describe various elements, components, regions, parts and/or sections. These elements, components, regions, parts and/or sections, should not be limited by these terms. The terms may be used to distinguish one element, component, region, part and/or section, from another element, component, region, part and/or section. For example, a first element, component, region, part and/or section could be termed a second element, component, region, part and/or section without departing from the teachings of the present disclosure.

The term "nominal" as used herein refers to a desired, or target, value of a characteristic, measurement, weight, or other parameter for a component, product, or process, together with a range of values above and/or below the desired value. The range of values is typically due to slight variations in manufacturing processes or tolerances.

The foregoing description discloses only example embodiments. Modifications of the above-disclosed apparatus, systems, and methods which fall within the scope of the disclosure will be readily apparent to those of ordinary skill in the art. Accordingly, while the present disclosure has been provided in connection with example embodiments thereof, it should be understood that other embodiments may fall within the scope, as defined by the claims.

What is claimed is:

1. An electrical power distribution system, comprising:
   a pocketed multi-bolt joint stack having a first end and a second end;
   a first busway section having a first set of bus bars and a first joint end, the first joint end and the first end of the pocketed multi-bolt joint stack disposed in a first interleaved relationship;

a second busway section having a second set of bus bars and a second joint end, the second joint end and the second end of the pocketed multi-bolt joint stack disposed in a second interleaved relationship; and a first bolt, and a second bolt, each disposed in the pocketed multi-bolt joint stack, the first bolt and the second bolt having a spaced-apart relationship such that a region of the pocketed multi-bolt joint stack between the first bolt and the second bolt provides one or more pockets;

a tap box connected to the pocketed multi-bolt joint stack, wherein the one or more pockets are configured to receive one or more electrical stabs from the tap box, wherein the one or more electrical stabs are arranged to protrude distally away from a side of the tap box, wherein the electrical stabs are disposed within the one or more pockets of the pocketed multi-bolt joint stack.

2. The electrical power distribution system of claim 1, wherein the first bolt is disposed in the pocketed multi-bolt joint stack closer to the first joint end of the first busway section than to the second joint end of the second busway section, and the second bolt is disposed in the pocketed multi-bolt joint stack closer to the second joint end of the second busway section than to the first joint end of the first busway section.

3. The electrical power distribution system of claim 1, wherein the first busway section and the second busway section are co-linear with each other.

4. The electrical power distribution system of claim 3, wherein the pocketed multi-bolt joint stack is co-linear with the first busway section and the second busway section.

5. The electrical power distribution system of claim 1, wherein the pocketed multi-bolt joint stack is configured to provide electrical continuity between the first joint end of the first busway section, the second joint end of the second busway section, and the electrical stabs of the tap box.

6. The electrical power distribution system of claim 1, wherein the first busway section and the second busway section are nominally vertically oriented.

7. The electrical power distribution system of claim 1, wherein the first bolt and the second bolt are positioned to provide nominally equal clamping force between the first joint end of the first busway section, the second joint end of the second busway section, and the electrical stabs of the tap box.

8. The electrical power distribution system of claim 7, wherein:
the first bolt does not extend through the first set of bus bars, the second set of bus bars, or the electrical stabs;
the second bolt does not extend through the first set of bus bars, the second set of bus bars, or the electrical stabs;
the first busway section includes a first housing that encloses at least a portion of the first set of bus bars; and
the second busway section includes a second housing that encloses at least a portion of the second set of bus bars.

9. The electrical power distribution system of claim 1, wherein the first bolt and the second bolt are configured to clamp together the pocketed multi-bolt joint stack, the first joint end of the first busway section, the second joint end of the second busway section, and the electrical stabs of the tap box.

10. A method, comprising:
coupling a first joint end of a first busway section to a second joint end of a second busway section with a pocketed multi-bolt joint stack, wherein the first busway section and the second busway section are nominally co-linear; and coupling a tap box to the pocketed multi-bolt joint stack;
wherein the pocketed multi-bolt joint stack includes at least two spaced-apart clamping bolts that are spaced apart from each other in a linear direction of the first and second busway sections so as to define one or more pockets for the tap box to couple to the pocketed multi-bolt joint stack, arranging in the tap box one or more electrical stabs protruding distally away from a side of the tap box;

disposing the one or more electrical stabs in the one or more pockets between the at least two spaced-apart clamping bolts; and torquing the at least two spaced-apart clamping bolts to a predetermined specification to mechanically secure the tap box within the one or more pockets.

11. The method of claim 10, further comprising:
disposing a first one of the at least two clamping bolts in the pocketed multi-bolt joint stack such that the first one of the at least two clamping bolts is closer to the first joint end of the first busway section than to the second joint end of the second busway section; and
disposing a second one of the at least two clamping bolts in the pocketed multi-bolt joint stack such that the second one of the at least two clamping bolts is closer to the second joint end of the second busway section than to the first joint end of the first busway section.

12. The method of claim 11, wherein a section of the pocketed multi-bolt joint stack between the at least two spaced-apart clamping bolts provides one or more pockets into which one or more electrical stabs of a tap box may be disposed.

13. The method of claim 10, further comprising:
providing the first busway section, the first busway section having a first set of bus bars; and
providing the second busway section, the second busway section having a second set of bus bars;
wherein the first busway section includes a first housing that encloses at least a portion of the first set of bus bars, and the second busway section includes a second housing that encloses at least a portion of the second set of bus bars.

14. A multi-bolt joint stack for use in forming an electrical power distribution system, the multi-bolt joint stack comprising:
a plurality of conductive plate sets, each conductive plate set including a first conductive plate and a second conductive plate separated by a first spacer and a second spacer;
a first clamping bolt extending through the plurality of conductive plate sets and the first spacer of each conductive plate set; and
a second clamping bolt extending through the plurality of conductive plate sets and the second spacer of each conductive plate set;
wherein the first clamping bolt and the second clamping bolt are separated from each other so as to define a plurality of pockets within the multi-bolt joint stack, each pocket being formed by the first conductive plate, the second conductive plate, the first spacer and the second spacer of the plurality of conductive plate sets; and
wherein the plurality of pockets are configured to receive electrical stabs from a tap box, which constitutes a separate structure from busway sections of the electrical power distribution system interconnected by way of the multi-bolt joint stack.

15. The multi-bolt joint stack of claim 14 first comprising a first side configured to receive a joint end of a first busway section and a second side configured to receive a joint end of a second busway section, wherein the first clamping bolt is disposed in the multi-bolt joint stack closer to the first side of the multi-bolt joint stack than the second clamping bolt and the second clamping bolt is disposed in the multi-bolt joint stack closer to the second side of the multi-bolt joint stack than the first clamping bolt.

16. The multi-bolt joint stack of claim 15 further comprising an insulating layer between each conductive plate set.

17. The multi-bolt joint stack of claim 14 further comprising a plurality of conductive stabs, each conductive stab positioned within and extending from one of the plurality of pockets so as to form a multi-bolt joint stack having male stabs.

18. The multi-bolt joint stack of claim 14 further comprising a plurality of sets of first and second clamping bolts.

* * * * *